(12) United States Patent
Cooley et al.

(10) Patent No.: US 7,571,325 B1
(45) Date of Patent: Aug. 4, 2009

(54) REMOTE IDENTIFICATION OF BLOCKED WEBSITES WHILE MAINTAINING USER PRIVACY

(75) Inventors: Shaun Cooley, El Segundo, CA (US); Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 787 days.

(21) Appl. No.: 11/079,777

(22) Filed: Mar. 14, 2005

(51) Int. Cl.
*H04L 9/00* (2006.01)
*H04L 9/32* (2006.01)

(52) U.S. Cl. ............................... 713/181; 726/2; 726/3; 726/4

(58) Field of Classification Search .................. 726/2–4, 726/11–12; 713/181, 168, 161–162, 154
See application file for complete search history.

(56) References Cited

U.S. PATENT DOCUMENTS 7,171,439 B2 * 1/2007 Honig ........................ 709/200

2002/0032738 A1 * 3/2002 Foulger et al. .............. 709/206
2007/0299915 A1 * 12/2007 Shraim et al. ............... 709/206

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759,1110435,00.asp>, Woburn, MA, U.S.A.

* cited by examiner

*Primary Examiner*—Hosuk Song
(74) *Attorney, Agent, or Firm*—Fenwick & West LLP

(57) ABSTRACT

Methods, apparati, and computer-readable media for regulating a user's access to a Web page. A method embodiment of the present invention comprises the steps of hashing (31) a URL associated with a Web page requested by the user; comparing (32) the hashed URL with a list (24) of pre-stored URL hashes; and granting (34) or denying (37) access to the requested Web page based upon results of the comparing step (32).

22 Claims, 4 Drawing Sheets

REMOTE IDENTIFICATION OF BLOCKED WEBSITES WHILE MAINTAINING USER PRIVACY

TECHNICAL FIELD

This invention pertains to the field of selectively blocking or granting access to Websites based upon pre-established criteria.

BACKGROUND ART

FIG. 1 illustrates a conventional prior art approach for restricting access to Websites. The user of client computer 1 attempts to access a Website over a network 4, such as the Internet. Control software 2 is associated with client computer 1, and serves to limit access to the requested Websites. In the case where the user of client computer 1 is a minor child, the control software 2 may have been installed on client computer 1 by the user's parent, and be controlled by said parent. In the case where client computer 1 is one of many computers in an enterprise environment, the control software 2 may have been installed, and be operated, by the system administrator of the enterprise. In the conventional prior art system, a URL (Universal Resource Locator) list 5, containing millions of URLs grouped by category, is maintained on the network 4 by the publisher of control software 2. The contents of URL list 5 are periodically downloaded from network 4 to a buffer memory 3 associated with client computer 1. When the user of client computer 1 wishes to access a Website, the URL of the Website is sent as an input to buffer memory 3, which outputs the category or categories of Website associated with the URL and sends these categories to control software 2. Control software 2 then compares the returned categories with a pre-stored list of categories. In blacklist mode, the categories are those that the administrator of control software 2 has decided are categories that should be blocked from the user of computer 1. In whitelist mode, the pre-stored list of categories lists those categories that the administrator of control software 2 has decided should be allowed to be viewed by the user of client computer 1. As a result of this comparison, the desired Web page is either sent to client computer 1 or blocked from client computer 1.

A disadvantage of this method is the fact the size of URL list 5 tends to grow over time, and thus it becomes slow and unwieldy to send updated URL lists 5 to all the client computers 1 in the serviced group. This problem is exacerbated as the number of client computers 1 grows larger and larger over time.

The present invention overcomes these disadvantages, while preserving the privacy of the users of client computers 1.

DISCLOSURE OF INVENTION

Methods, apparati, and computer-readable media for regulating a user's access to a Web page. A method embodiment of the present invention comprises the steps of hashing (31) a URL associated with a Web page requested by the user; comparing (32) the hashed URL with a list (24) of pre-stored URL hashes; and granting (34) or denying (37) access to the requested Web page based upon results of the comparing step (32).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
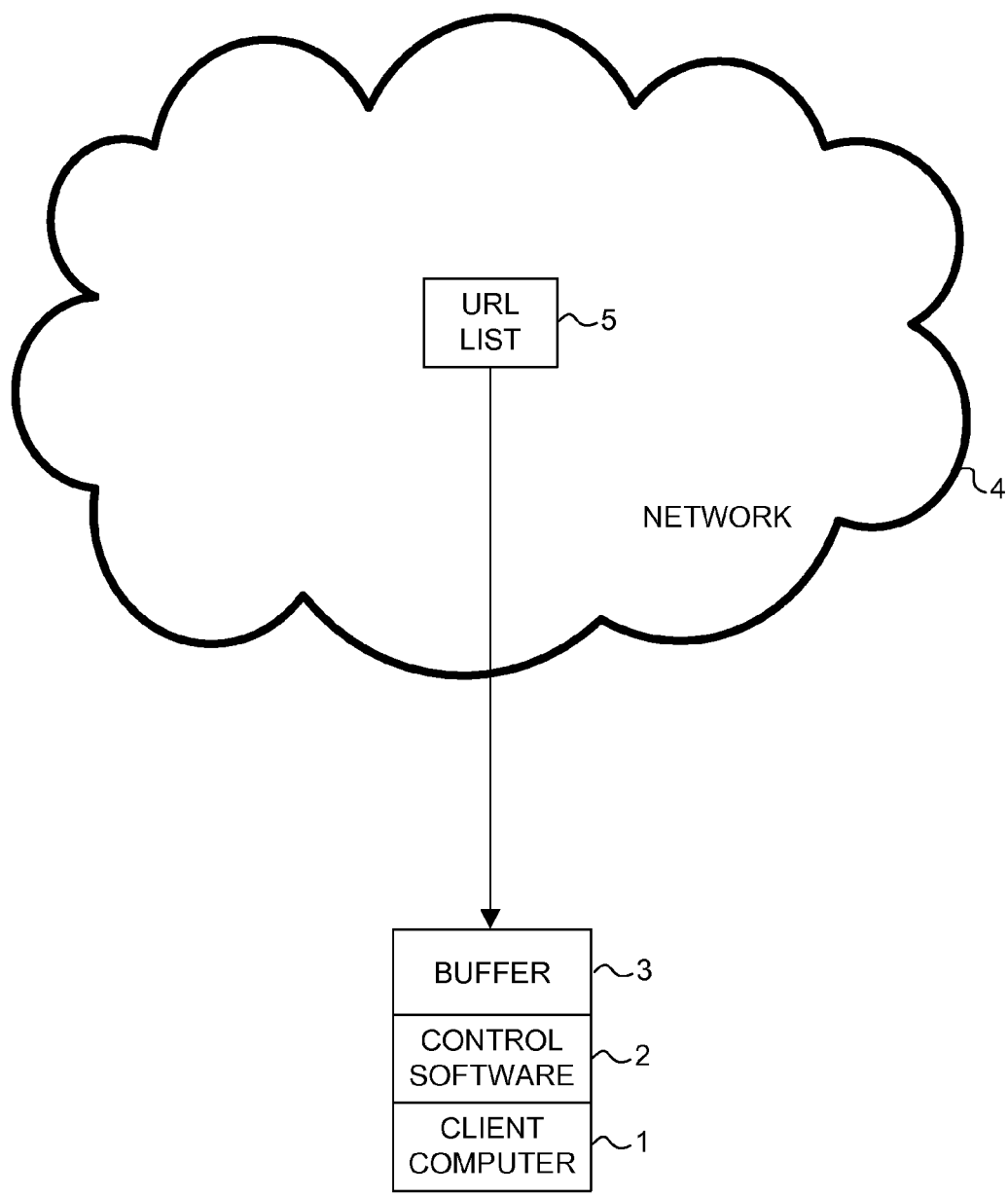
FIG. 1 is a block diagram illustrating prior art.
Figure 2:
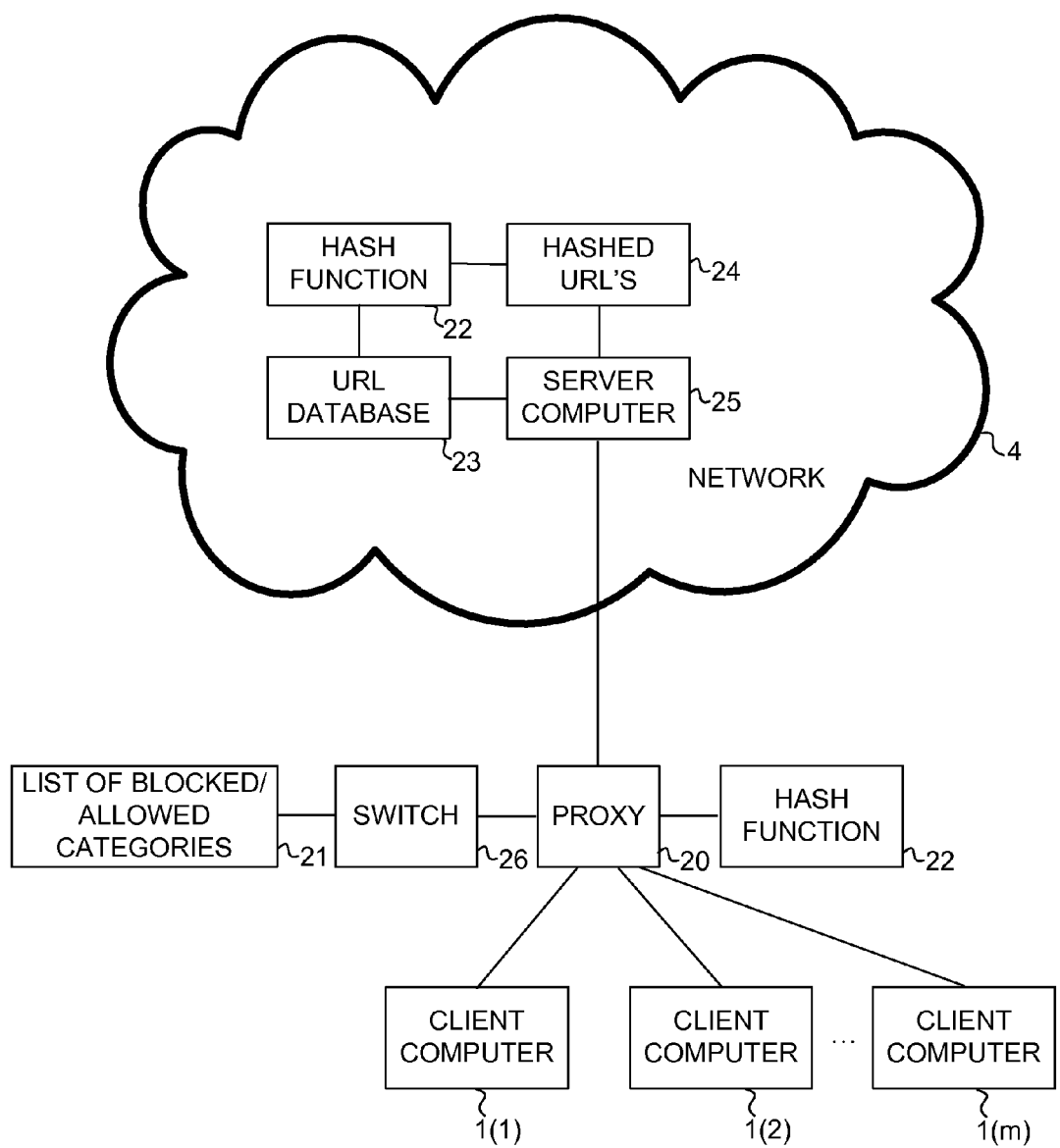
FIG. 2 is a block diagram illustrating an apparatus embodiment of the present invention.

FIG. 2 illustrates an embodiment of the present invention in which there are a plurality of client computers 1. The client computers 1 may be networked together in an enterprise subnetwork. The enterprise may be a company, university, or other organization. In this embodiment, there is a single proxy 20 for the subnetwork.

Proxy 20 is initialized and controlled by the system administrator of the subnetwork. In an enterprise embodiment, proxy 20 is usually a remote proxy, i.e., not physically co-located with any client computer 1. This is to discourage disabling of proxy 20 by a user of a computer 1. In alternative embodiments, e.g., in a home environment, there may be just one client computer 1. In this case, proxy 20 is usually a local proxy, i.e., physically proximate to computer 1. In this case, proxy 20 may be initialized and controlled by the parent of a minor child user of computer 1.

In both the enterprise and home embodiments, the administrator of proxy 20 decides what categories of Websites the users of computers 1 are allowed to view (in the whitelist mode of the present invention) or are not allowed to view (in the blacklist mode of the present invention). This information is contained in a list 21 of blocked and/or allowed categories. List 21 is associated with proxy 20. When the invention is operating in blacklist mode, just the blocked categories portion of list 21 is used, or else list 21 is a list of just blocked categories. When the invention is operating in whitelist mode, just the allowed categories portion of list 21 is used, or else list 21 is a list of just allowed categories. There can be a switch 26 associated with proxy 20 to switch the mode of the invention between blacklist mode and whitelist mode. When switch 26 is present, list 21 contains both blocked and allowed categories, but the allowed categories are disabled by switch 26 when the invention is operating in blacklist mode and the blocked categories are disabled by switch 26 when the invention is operating in whitelist mode.

Also associated with proxy 20 is a pre-selected hash function 22. As used herein, "hash function" is used in the broad sense to mean any one-way function that converts a relatively long variable length input into a relatively short fixed length output. By "one-way" is meant that it is extremely difficult to calculate the input when one knows just the output. Suitable hash functions that can be used in the present invention include MD5, SHA (Secure Hash Algorithm), and CRC (Cyclic Redundancy Check). A good hash function is characterized by the fact that it is very rare for two different inputs to hash to the same output.

Computers 1 are in communicative contact with network 4. Network 4 can be any type of network, such as a Local Area Network (LAN), a Wide Area Network (WAN), or the Internet.

On network 4 is an updatable URL list 23, preferably in database form. A good URL list 23 will contain most of the URLs associated with locations (Web pages) on the network 4. In the case where network 4 is the Internet, URL list 23 may contain millions of entries. The entries are sorted into a pre-established set of categories. For example, there may be 128 such categories. Storing list 23 in database form has the advantage of permitting quick look-ups, additions, and deletions to list 23. List 23 is associated with a server computer 25 maintained by a software publisher or other enterprise. Also associated with server computer 25 is the same hash function 22 that is associated with proxy 20. Hash function 22 is used by server 25 to create a database 24 of hashed URLs from the original list 23 of URLs. Database 24 of hashed URLs maintains the same categorization of the URLs as in URL list 23.

All of the inventive modules (20-26) of the present invention can be implemented in any combination of hardware, firmware, and/or software. When implemented in software, the various modules can be embodied on one or more computer-readable media such as one or more floppy disks, hard disks, DVDs, CDs, etc.

Figure 3:
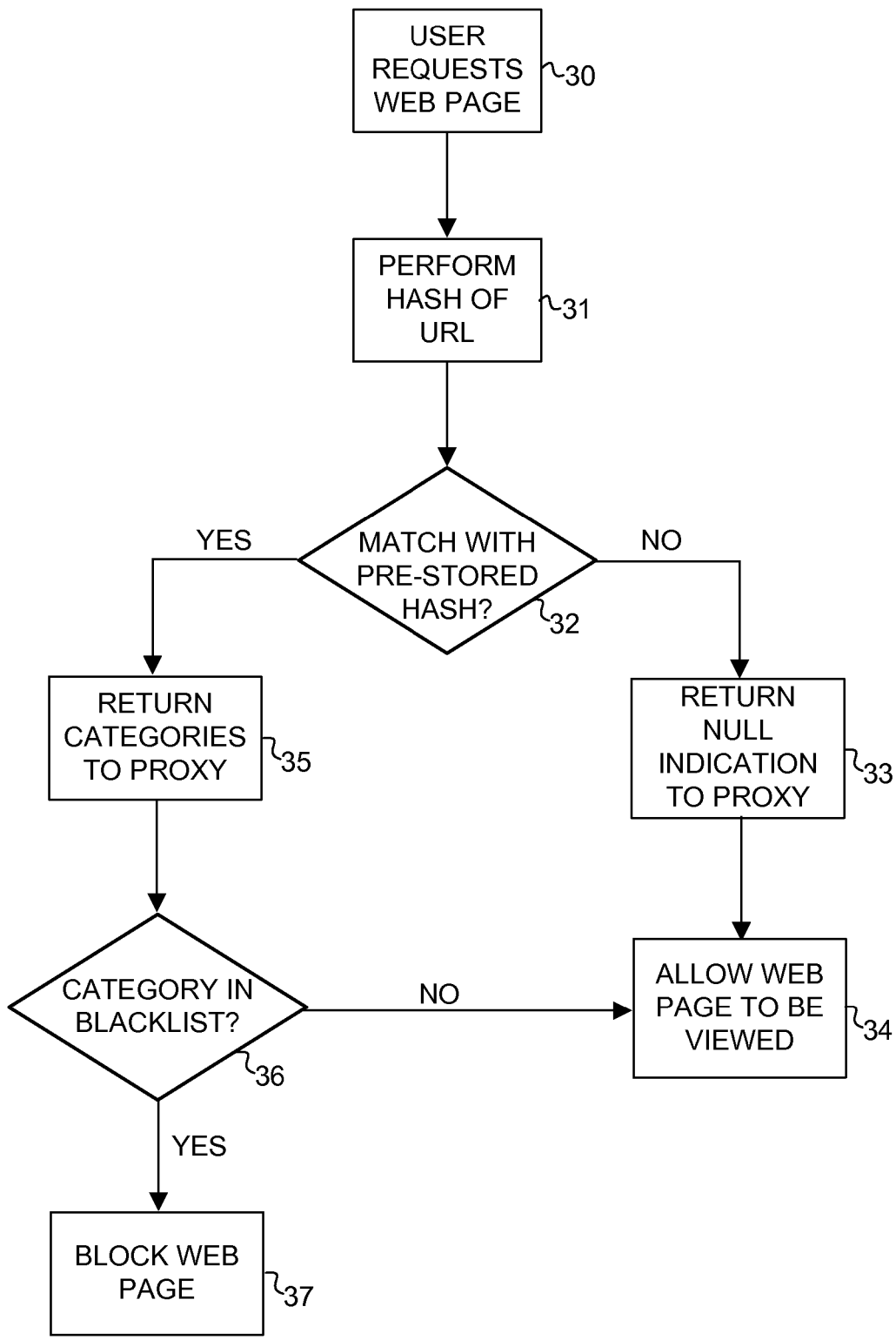
FIG. 3 is a flow diagram illustrating a first method embodiment of the present invention.

The blacklist mode of the present invention is illustrated in FIG. 3. At step 30, a user of a computer 1 requests a Web page using a URL. At step 31, proxy 20 performs a hash of the requested URL using hash function 22, then sends the hashed URL over the network 4 to server 25. At step 32, server 25 compares the hashed URL with the pre-stored URL hashes contained within database 24. Sending just a hash rather than the entire URL to the server 25 advantageously preserves the privacy of the user, because the hash function 22 is a one-way function: the administrator of server 25 would find it extremely difficult to derive the URL from just its hash.

If the hashed URL does not match any entry in database 24, server 25 returns to proxy 20 a null indication at step 33. The null indication may be a single byte, such as 0x00 in hexadecimal notation. Since the invention is operating in blacklist mode, at step 34, proxy 20 allows the requested Web page to be viewed by computer 1.

If the hashed URL matches a pre-stored hash at step 32, server 25 returns to proxy 20 a list of categories that were matched at step 35. This list of categories may be in the form of a bit stream. For example, if there are 128 pre-selected categories of URLs, the bit stream sent from server 25 to proxy 20 can be up to 128 bits long, with each bit representing one of the possible 128 URL categories. The identification of the categories corresponding to the bits is pre-selected. For example, bit 1 corresponds to category 1, bit 2 corresponds to category 2, etc. If a given bit is set to a 1, this signifies that there has been a match for the corresponding pre-selected category. Unnecessary bits (or bytes, when the TCP/IP protocol is being used) do not have to be sent, thereby saving time and resources. "Unnecessary" can be defined as bits (or bytes) at the end of the string that are all zero.

At step 36, proxy 20 compares the returned matched categories against blacklist 21 of blocked categories. If there are no matches as a result of this comparison, proxy 20 allows the Web page to be viewed by computer 1 at step 34. If, on the other had, there is a match, proxy 20 blocks the Web page from being viewed by computer 1 at step 37.

Figure 4:
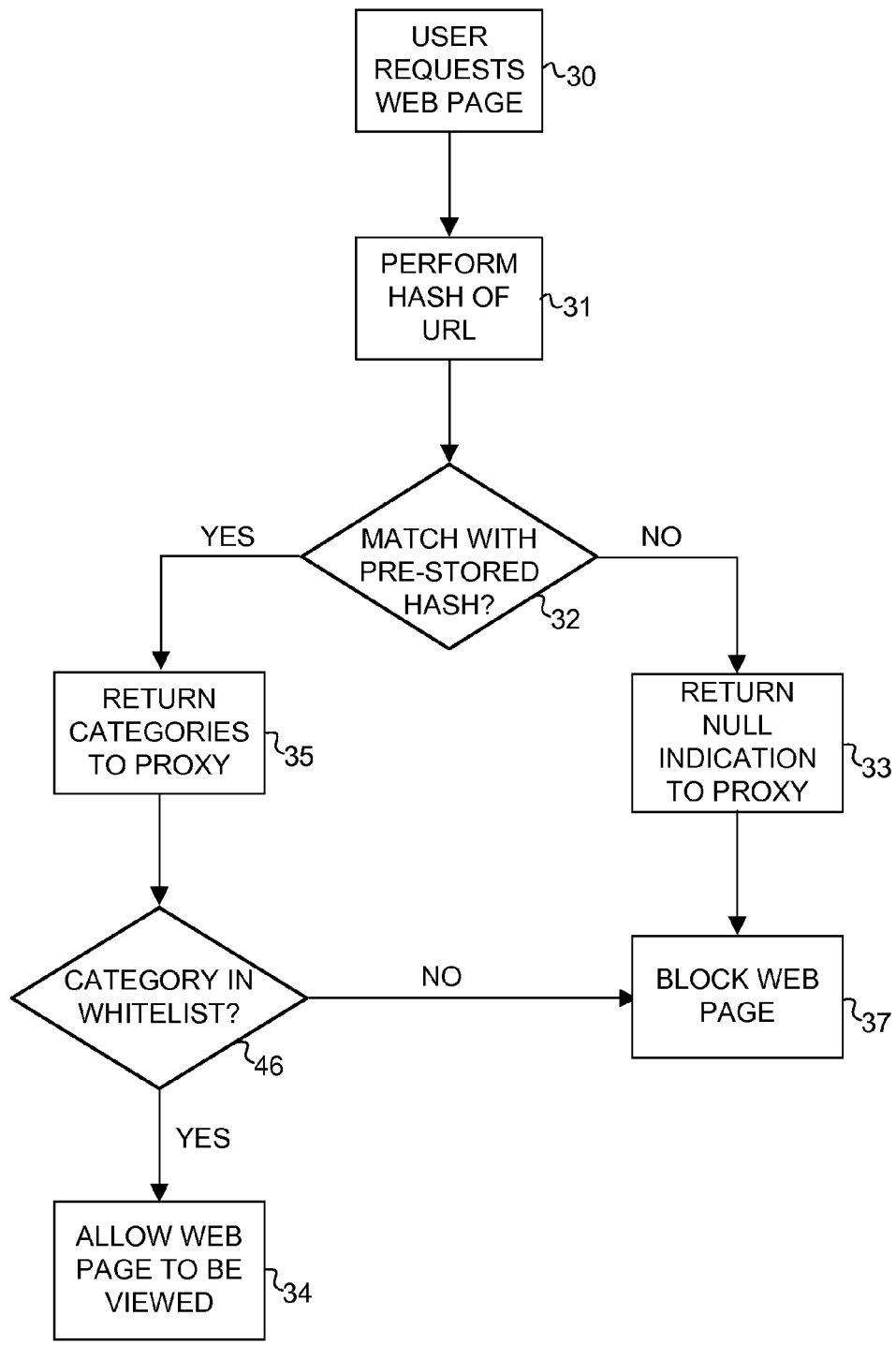
FIG. 4 is a flow diagram illustrating a second method embodiment of the present invention.

The whitelist mode of the present invention is illustrated in FIG. 4. Note that the steps of FIG. 4 are identical to the steps of FIG. 3, with the following exceptions:

In whitelist mode, when sever 25 returns the null indication to proxy 20 indicating that the newly hashed URL has not matched any entry in database 24 of pre-stored hashed URLs, proxy 20 blocks the Web page from being viewed by computer 1 at step 37 (unlike the case in the blacklist mode, where the Web page was allowed to be viewed).

In the whitelist mode, after step 35, proxy 20 compares the returned matched categories against the whitelist 21 of allowed categories in step 46 (rather than comparing against a blacklist as in the blacklist mode). Then, when there is a match between a returned matched category and an item in whitelist 21 of allowed categories, proxy 20 allows the Web page to be viewed by computer 1 at step 34 (rather than blocked as in the blacklist mode).

The hashing that is performed at step 31 can be performed piecewise to obtain better granularity. This can be important for a large and popular domain such as Yahoo.com which encompasses several categories of URLs. Suppose, for example, the path of the requested URL is www.yahoo.com/social/april/2000. In one embodiment, proxy 20 first hashes the entire path, then hashes www.yahoo.com/social/april, then hashes www.yahoo.com/social, then hashes www.yahoo.com, then hashes yahoo.com. Server 25 in turn performs comparisons against database 24 using all of these hashes.

An example of a multi-hash embodiment, for the URL http://www.avcenter.symantec.co.uk/sample/cgi-, is as follows:

| Multi-Hash Layout bin/script.php?para1 = value | Hash |
|---|---|
| Registered Hostname Length (1 byte) | 0x0E (length of ("symantec.co.uk") |
| Registered Hostname Hash (4 bytes) | 0xF2C9AC90 (for "symantec.co.uk") |
| Count of sub-hostnames (1 byte) | 0x02 ("www" and "avcenter") |
| Sub-Host Hash[0 . . . cnt] (4 bytes each) | 0xC8F3B90A (for "www") |
| Path Piece Has[0 . . . n] (4 bytes each) | 0xA9B0C32F (for "avcenter") |
| Script Params Hash (4 bytes) | 0x874B9C01 (for "sample") |
| | 0xE90623AC (for "cgi-bin") |
| | 0x8C12B90F (for "script.php") |
| | 0xD9B68B5C (for "param1 = value") |

Multi-Hash:
0x0E|F2C9AC90|02|C8F3B90A|A9B0C32F|874B9C01|E90623AC|8C12B90F|D9B68B5C
Multi-Hash Derivatives:
0x0E|F2C9AC90|02|C8F3B90A|A9B0C32F|874B9C01|E90623AC|8C12B90F
0x0E|F2C9AC90|02|C8F3B90A|A9B0C32F|874B9C01|E90623AC
0x0E|F2C9AC90|02|C8F3B90A|A9B0C32F|874B9C01
0x0E|F2C9AC90|02|C8F3B90A|A9B0C32F
0x0E|F2C9AC90|01|A9B0C32F|874B9C01|E90623AC|8C12B90F
0x0E|F2C9AC90|01|A9B0C32F|874B9C01|E90623AC
0x0E|F2C9AC90|01|A9B0C32F|874B9C01
0x0E|F2C9AC90|01|A9B0C32F
0x0E|F2C9AC90|00|874B9C01|E90623AC|8C12B90F
0x0E|F2C9AC90|00|874B9C01|E90623AC
0x0E|F2C9AC90|00|874B9C01|
0x0E|F2C9AC90|00
* "|" chars are only for readability In another multi-hash embodiment, proxy 20 performs a plurality of hashes all at the same time, one on each piece of the path. These piecewise hashes are all sent by proxy 20 over network 4 at the same time. Server 25 then tries to find a match using the composite hash. If a match is found, server 25 returns the category information to proxy 20. If no match is found, server 25 drops the last piece of the composite hash. Then, if a match is found, server 20 returns the category data to proxy 20. If not, the process is repeated by server 20 dropping another piece from the composite hash.

In order for these multi-hash embodiments to work, there has to be a convention for the number of bytes for the various pieces of the composite hash. Thus, for example, four bytes worth of hash can be used for the domain, and two bytes of hash can be used for each path and for the "www".

It may be desirable to augment the list of URL categories from time to time. The administrator of URL database 23 updates the categories within database 23 and then sends the augmented list of categories over network 4 to proxy 20. New categories should be added to the end of the category list, to avoid tampering with the proper functioning of the legacy portion of the category list. Once proxy 20 receives an augmented category list, the administrator of proxy 20 is given the opportunity to update list 21 of blocked/allowed categories accordingly.

Database 23 can be expanded to store information other than just URL categories. One example of such expanded information is user-reported misclassifications of URLs. There can be a pre-selected number of complaints that is built into database 23. When the pre-selected number of complaints regarding a certain URL is exceeded, the administrator of database 23 can be asked to consider a reclassification of that URL.

A second category of additional information that can be stored within database 23 is a date/timestamp showing the last date and time that a URL was accessed. There can be a module associated with database 23 that automatically purges URLs that have not been accessed for a pre-selected period of time, such as one year. Alternatively, once the pre-selected period of time has been exceeded, a module associated with database 23 can ask the system administrator of database 23 whether he or she wishes to purge the URL in question.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, the hashing 31 could be done by client computer 1 rather than by proxy 20. In other embodiments, proxy 20 is dispensed with entirely, and all of the functions ascribed to proxy 20 in the above discussion are performed by client computer 1.

What is claimed is:

1. A computer-implemented method for using a computer to regulate a user's access to a Web page, said method comprising the steps of:
   hashing a URL associated with a Web page requested by the user, wherein the hashing comprises separating the URL into a plurality of pieces and hashing each of the pieces separately to form a plurality of hashed URL pieces;
   receiving a list of one or more categories responsive to the plurality of hashed URL pieces;
   comparing categories in the received list with categories in a pre-stored list; and
   regulating access to the requested Web page based upon results of the comparing step.

2. The method of claim 1 wherein:
   the method operates in blacklist mode; and
   when the categories in the received list do not match a category in the pre-stored list, access to the requested Web page is granted.

3. The method of claim 1 wherein:
   the received list comprises a bit stream; and
   the bit stream comprises a plurality of bits, each bit corresponding to a single category.

4. The method of claim 1 wherein:
   the method operates in blacklist mode;
   the pre-stored list comprises blocked categories; and
   when a category in the received list matches a category in the pre-stored list, access to the requested Web page is denied.

5. The method of claim 1 wherein:
   the method operates in blacklist mode;
   the pre-stored list comprises blocked categories; and
   when a category in the received list does not match a category in the pre-stored list, access to the requested Web page is granted.

6. The method of claim 1 wherein:
   the method operates in whitelist mode;
   the pre-stored list comprises allowed categories; and
   when a category in the received list matches a category in the pre-stored list, access to the requested Web page is allowed.

7. The method of claim 1 wherein:
   the method operates in whitelist mode;
   the pre-stored list comprises allowed categories; and
   when a category in the received list does not match a category in the pre-stored list, access to the requested Web page is denied.

8. The method of claim 1 wherein:
   the method operates in whitelist mode; and
   when a category in the received list does not match a category in the pre-stored list, access to the requested Web page is denied.

9. The method of claim 1 wherein the hashing step is performed by a hash function from the group of hash functions consisting of MD5, SHA, and CRC.

10. The method of claim 1, wherein the hashing step further comprises identifying a plurality of categories specified by the URL, wherein:
    the URL is separated into a plurality of pieces based at least in part on the plurality of categories, each of the URL pieces representing one category from the plurality.

11. At least one computer-readable medium storing executable computer program instructions for regulating a user's access to a Web page, said computer program instructions performing the steps of:
    hashing a URL associated with a Web page requested by the user, wherein the hashing comprises separating the URL into a plurality of pieces and hashing each of the pieces separately to form a plurality of hashed URL pieces;
    receiving a list of one or more categories responsive to the plurality of hashed URL pieces;
    comparing categories in the received list with categories in a pre-stored list; and
    regulating access to the requested Web page based upon results of the comparing step.

12. The at least one computer-readable medium of claim 11 wherein:
    the instructions operate in blacklist mode; and
    when the categories in the received list do not match a category in the pre-stored list, access to the requested Web page is granted.

13. The at least one computer-readable medium of claim 11 wherein:
- the received list comprises a bit stream; and
- the bit stream comprises a plurality of bits, each bit corresponding to a single category.

14. The at least one computer-readable medium of claim 11 wherein:
- the instructions operate in blacklist mode;
- the pre-stored list comprises blocked categories; and
- when a category in the received list matches a category in the pre-stored list, access to the requested Web page is denied.

15. The at least one computer-readable medium of claim 11 wherein:
- the instructions operate in blacklist mode;
- the pre-stored list comprises blocked categories; and
- when a category in the received list does not match a category in the pre-stored list, access to the requested Web page is granted.

16. The at least one computer-readable medium of claim 11 wherein:
- the instructions operate in whitelist mode;
- the pre-stored list comprises allowed categories; and
- when a category in the received list matches a category in the pre-stored list, access to the requested Web page is allowed.

17. The at least one computer-readable medium of claim 11 wherein:
- the instructions operate in whitelist mode;
- the pre-stored list comprises allowed categories; and
- when a category in the received list does not match a category in the pre-stored list, access to the requested Web page is denied.

18. The at least one computer-readable medium of claim 11 wherein:
- the instructions operate in whitelist mode; and
- when a category in the received list does not match a category in the pre-stored list, access to the requested Web page is denied.

19. The at least one computer-readable medium of claim 11 wherein the hashing step is performed by a hash function from the group of hash functions consisting of MD5, SHA, and CRC.

20. The at least one computer-readable medium of claim 11, wherein the hashing step further comprises identifying a plurality of categories specified by the URL, wherein:
- the URL is separated into a plurality of pieces based at least in part on the plurality of categories, each of the URL pieces representing one category from the plurality.

21. A computer-implemented method for using a computer to regulate a user's access to a Web page, comprising:
- receiving from a client a plurality of hashed URL pieces, wherein the plurality of hashed URL pieces are derived by separating a URL associated with a Web page into a plurality of pieces and hashing each of the pieces separately;
- comparing the plurality of hashes with a list of pre-stored URL hashes;
- generating a list comprised of one or more categories based upon the comparison; and
- providing the list to the client.

22. The method of claim 21, wherein the plurality of hashed URL pieces are further derived by identifying a plurality of categories specified by the URL, each of the hashed URL pieces representing one category from the plurality.

* * * * *